US006435040B1

(12) United States Patent
Feller

(10) Patent No.: US 6,435,040 B1
(45) Date of Patent: Aug. 20, 2002

(54) INERTIAL FLOW SENSOR AND METHOD

(76) Inventor: Murray F. Feller, Rte. 2, Box 562A, Micanopy, FL (US) 32667

( * ) Notice: Subject to any disclaimer, the term of this patent is extended or adjusted under 35 U.S.C. 154(b) by 0 days.

(21) Appl. No.: 09/606,132

(22) Filed: Jun. 28, 2000

(51) Int. Cl.[7] .............................................. G01F 1/28
(52) U.S. Cl. .................................................. 73/861.71
(58) Field of Search ....................... 73/861.71, 861.357, 73/861.356, 861.355, 54.41, 505, 861; 324/233

(56) References Cited

U.S. PATENT DOCUMENTS

| | | | |
|---|---|---|---|
| 4,348,906 A | | 9/1982 | Feller |
| 4,462,264 A | | 7/1984 | Feller |
| 4,674,331 A | * | 6/1987 | Watson ........................ 73/505 |
| 5,059,905 A | * | 10/1991 | Drits ........................... 324/233 |
| 5,390,541 A | | 2/1995 | Feller |
| 5,827,979 A | * | 10/1998 | Schott et al. .......... 73/861.357 |
| 5,948,978 A | | 9/1999 | Feller |
| 6,023,969 A | | 2/2000 | Feller |
| 6,044,694 A | * | 4/2000 | Anderson et al. .......... 73/54.41 |

* cited by examiner

Primary Examiner—Benjamin R. Fuller
Assistant Examiner—Jewel V. Thompson
(74) Attorney, Agent, or Firm—David Kiewit

(57) ABSTRACT

A transmitting electro-mechanical transducer is energized by electric pulses at a low frequency (typically several hertz to several kilohertz) to provide corresponding pulses of movement in the fluid. The fluid movement displaces a volume of the fluid in one direction and the motion of that fluid, when combined with the surrounding fluid, produces a fluid rotation which is sustained for a sufficient period of time, to be detected at a later time as an acoustic signal. A known distance downstream of the transmitting transducer, a receiving transducer detects the rotating volume of fluid. From the distance between the transmitting and receiving transducers and the time interval between their transmitted and detected signals, the fluid flow rate can be determined. The transmitting and receiving transducers can interchange their functions so that the difference in the time intervals is used to determine fluid flow rate. The transmitting transducer may also be energized with single pulses, a burst of pulses, or a continuous wave of pulses so that various methods, including phase detectors, may be used to determine the time difference between the received and transmitted, or reference signal, for providing a fluid flow rate signal.

24 Claims, 4 Drawing Sheets

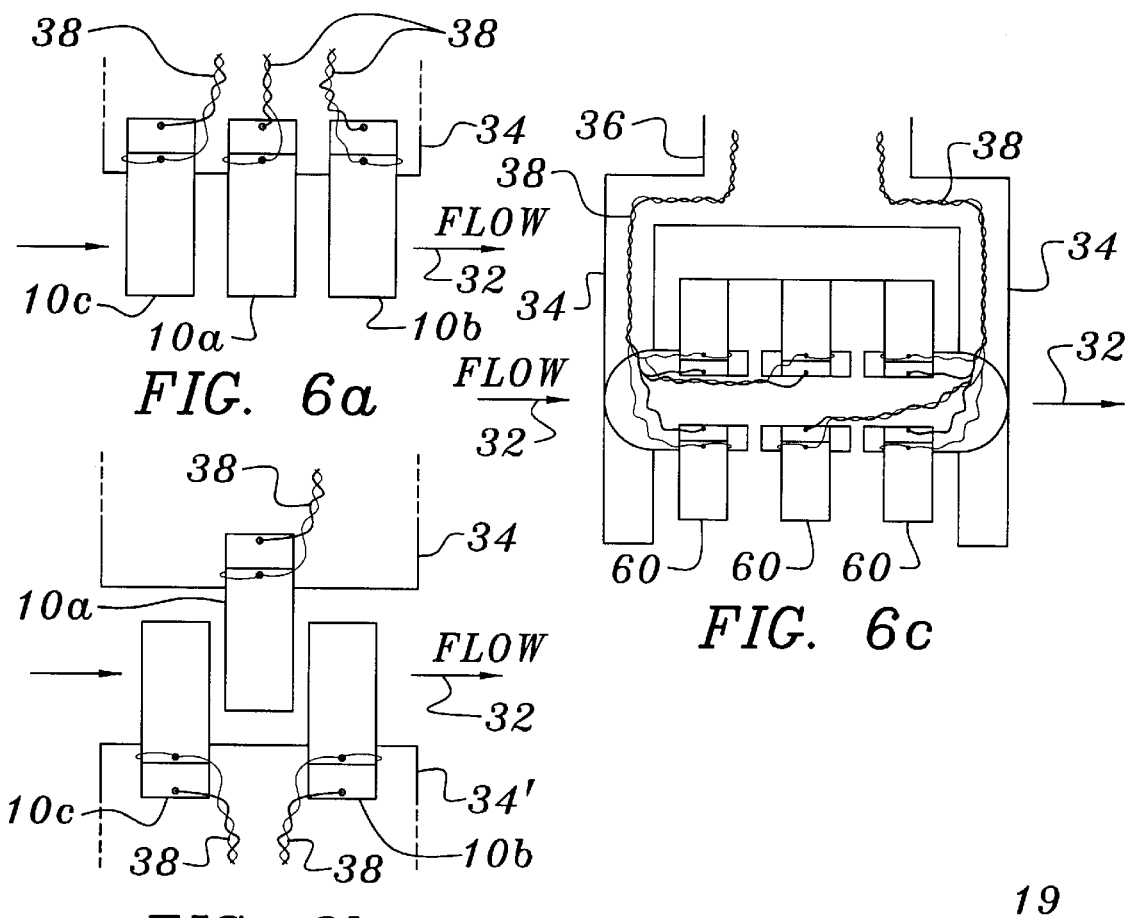
FIG. 6a
FIG. 6b
FIG. 6c
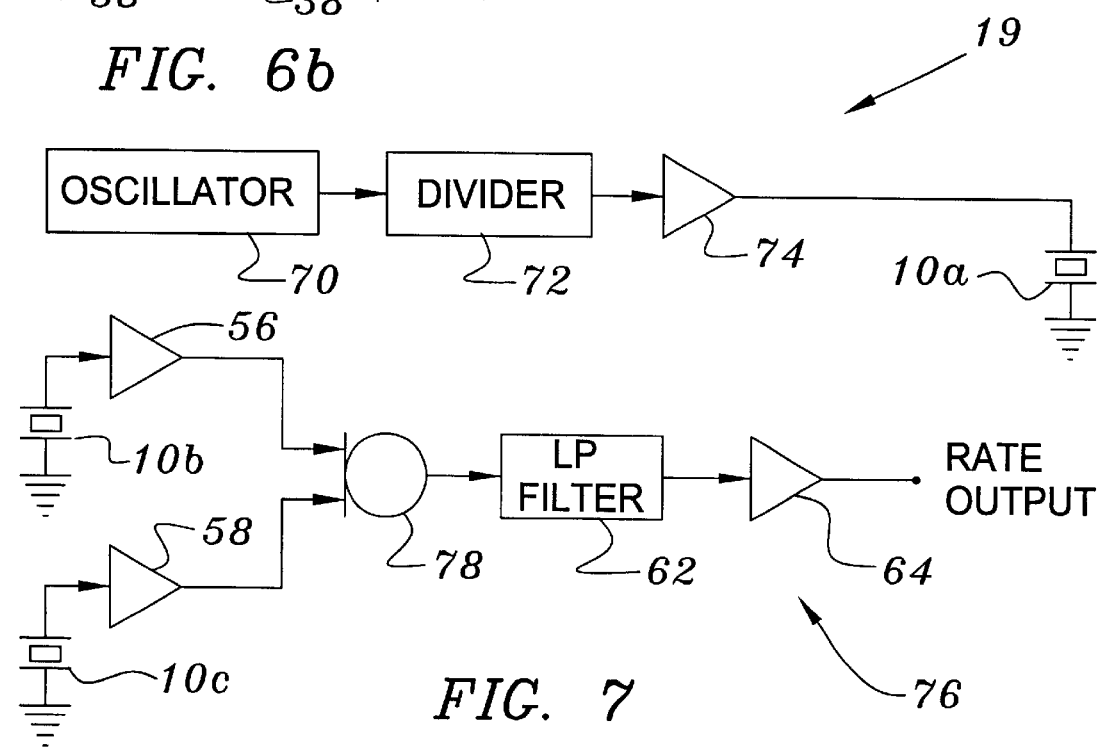
FIG. 7

INERTIAL FLOW SENSOR AND METHOD

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to a method for measuring the flow rate of a fluid. In particular, it relates to a flow measurement method in which a portion of the fluid is periodically given a motion in addition to that of the fluid flow, and in which that additional motion can be sensed to determine flow rate.

2. Background Information

For reference purposes, there are a number of different types of flow sensors which use acoustic methods to sense the flow rate of a fluid. One major type is the ultrasonic transit time flow sensor, also known as the "time of flight" ultrasonic flow sensor, which detects the acoustic propagation time difference between the upstream and downstream ultrasonic transmissions resulting from the flowing fluid and which processes the information to derive a fluid flow rate. Another major type is the Doppler type which detects the difference in frequency between transmitted acoustic signals and those reflected by acoustically reflective entities in the fluid. Both of these methods utilize relatively high frequencies for the acoustic transmissions (typically hundreds of kilohertz to several megahertz). Both methods are somewhat limited in application as they require sophisticated construction and supporting electronics which tend to make them large and expensive, and can produce substantial measurement errors under less than ideal conditions. Vortex shedding flow sensors detect relatively small easily corrupted signals and are limited in rangeability. Other methods, such as those described in my U.S. Pat. Nos. 4,348,906 and 4,462,264, use relatively low frequency ultrasonic and sonic transmissions to sense the rotation of a mechanical element, such as a turbine rotor, which is responsive to flow rate. Their big disadvantage is, of course, the reliance on a moving mechanical element which is often thought to be less reliable than other methods which are more electronically oriented and do not have any recognizably moving parts. Other methods also cited for reference purposes which rely on mechanical means for modulating the fluid flow are described in my U.S. Pat. Nos. 5,948,978, 6,023,969 and 5,390,541.

BRIEF SUMMARY OF THE INVENTION

It is therefore an object of this invention to produce a flow sensor capable of good measurement precision which is relatively easy to manufacture, requires simple supporting electronics, is adaptable to a wide range of installations and does not rely on the rotation of a mechanical element for its basic measurement of flow rate. A preferred inertial flow sensor of the present invention satisfies this and other objectives. The preferred flow sensor operates by setting into circular motion a small volume of the fluid being sensed and then detecting the rate of travel of that rotating fluid volume due to the fluid flow.

In one of the preferred embodiments of the present invention, a transmitting transducer is energized by electric pulses at a low frequency (typically several hertz to several kilohertz) to provide corresponding pulses of movement in the fluid. The fluid movement displaces a volume of the fluid in one direction and the motion of that fluid, when combined with the surrounding fluid filling the void, produces a fluid rotation which is sustained for a sufficient period of time because of inertia, to be detected at a later time as an acoustic signal. A known distance downstream of the transmitting transducer, a receiving transducer detects the rotating volume of fluid. From the distance between the transmitting and receiving transducers and the time interval between their transmitted and detected signals, the fluid flow rate can be determined. The transmitting and receiving transducers can interchange their functions so that the difference in the time intervals is used to determine fluid flow rate. The transmitting transducer may also be energized with single pulses, a burst of pulses, or a continuous wave of pulses so that various methods, including phase detectors, may be used to determine the time difference between the received and transmitted, or reference signal, for providing a fluid flow rate signal.

In another preferred embodiment of the invention, a transmitting transducer is energized and rotating volumes of fluid are generated as in the first preferred embodiment. However two receiving transducers, one located upstream and the other located downstream of the transmitting transducer, are used to detect the rotating volumes of fluid. The difference in time between the reception of the signals is a measure of fluid flow rate.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

The various advantages of the present invention will become apparent to one skilled in the art by reading the following specification and subjoined claims, and by referencing the following drawings in which:

FIGS. 6a–6c are largely schematic elevational views of several embodiments of the invention wherein each embodiment comprises three transducers.

FIG. 7 is a simplified electrical block diagram of a transducer driving and signal processing means used with a preferred embodiment of the invention using the flow sensor configuration of FIG. 5.

DETAILED DESCRIPTION OF THE INVENTION

Figure 1:
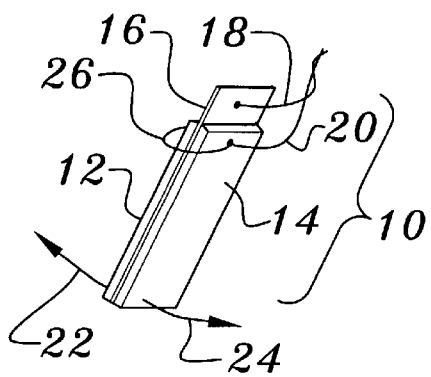
FIG. 1 is a largely schematic elevational view of a piezoelectric transducer used in a preferred embodiment of the invention.

Referring to FIG. 1, a piezoelectric transducer 10 is shown which is applicable to both the transmitting and receiving transducer functions of a preferred flow sensor 7 of the present invention The transducer 10 is conveniently a sandwich of two thin piezoelectric elements 12 and 14 bonded to a thin center foil 16, which may be brass, so as to resemble a thin vane. The elements 12 and 14 are polarized in the same direction and connected in parallel by wire 26 and foil 16 so that when a voltage is applied to the wire connections 18 and 20, one of the elements increases in length while the other decreases, resulting in a bending action. A reversal of the applied voltage produces a deflection in the opposite direction. Hence, if an AC voltage source is connected to wires 18 and 20, the transducer 10 will vibrate as indicated by arrows 22 and 24. Conversely, when transducer 10 is subjected to an applied force, it generates the corresponding electrical signals, which appear at wires 18 and 20.

Figure 9:
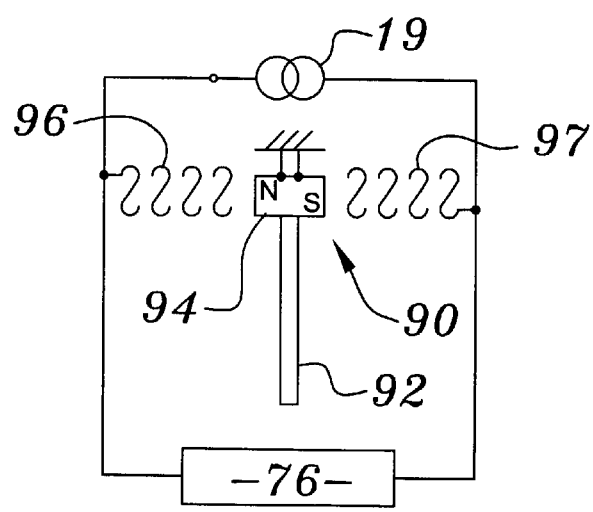
FIG. 9 is a schematic depiction of an electromagnetic transducer usable in a flow sensor of the invention.

Although the piezoelectric "bender" depicted in the drawing is the preferred transducer, those skilled in the art will recognize that many other mechanical-to-electrical and electrical-to-mechanical transducers are known. Many of these other transducers would be suitable for producing the desired mechanical movement used to generate the rotating volume of fluid, and also to convert the energy of the rotating volumes of fluid into electrical signals. Magnetostrictive, electromagnetic, photoelectric, and Hall effect transducers, for example, would also be applicable. For example, FIG. 9 depicts an electromagnetic transducer 90 comprising a vane 92 with a permanent magnet 94 that may be driven by an AC voltage applied to adjacent windings 96, 97 or, if moved by the fluid, can generate currents in the windings 96, 97 that can be processed by appropriate signal processing circuitry 76. Various other transducers may comprise, for example, an O-ring seal, a pivot and a certain amount of mechanical linkage. Furthermore, the vane configuration of transducer 10 may be replaced, for example, by a configuration in which the piezoelectric element or elements experience a thickness change with applied voltage or where piston action is provided electromagnetically, as in a solenoid. Mechanical linkage such as pushrods and hydraulic transmissions of the transmitted and received signals are also applicable. This wide range of transducer possibilities is realized because of the relatively low frequencies used in the preferred embodiments of the invention.

Figure 2:
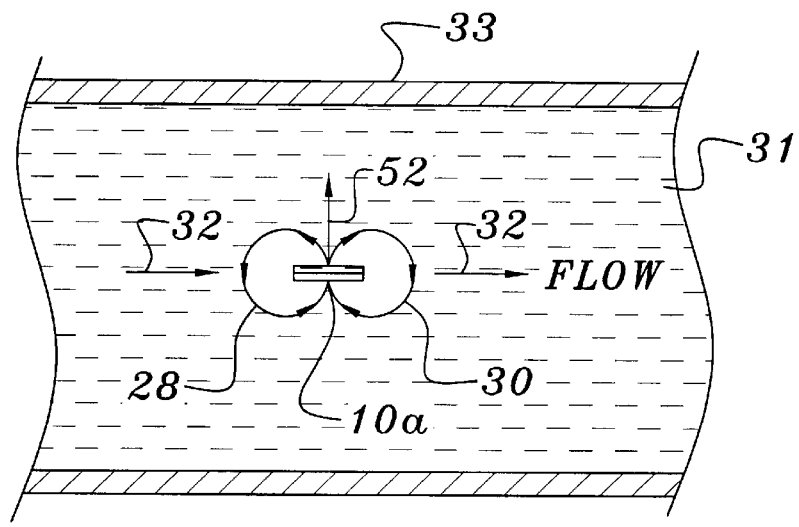
FIG. 2 is an end view of the transducer of FIG. 1 immersed in a fluid-filled pipe, the view including arrows schematically depicting the action of the transducer on the flowing fluid.

Turning now to FIG. 2, one finds a depiction, viewed from the bottom end of the transducer 10a, of the action of the transducer on the fluid 31, where an arrow 32 is used to denote the flow being sensed. In this depiction, the transducer 10a is being energized to move transverse to the flow direction 32 (i.e., upwardly in the view of FIG. 2, as indicated by the arrow 52). In doing so, the transducer moves a volume of fluid on its left up causing it to rotate counterclockwise as shown by the arrow 28. At the same time, the transducer moves a volume of fluid 30 on its right upwards, causing it to rotate clockwise. The centers of rotation of the two rotating fluid volumes 28, 30 are at the left edge and right edge of the transducer 10a, respectively. The rotating volumes of fluid 28 and 30 move at the flow rate of the fluid 31 (i.e., horizontally from left to right across the page in the depiction of FIG. 2) and retain their angular momentum for a long enough period of time that they can be detected for determining that flow rate.

To improve the clarity of presentation, the fluid and its containing vessel 33, if any, are not explicitly indicated in any figures of the drawing except for FIG. 2. The overall flow of fluid and the flow of local rotating regimes, however, are indicated with the arrows, as specified.

Figure 3:
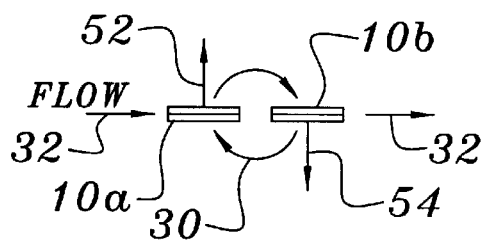
FIG. 3 is an end view of two of the transducers of FIG. 1, the view including arrows schematically depicting the action of the transducers on the flowing fluid.

In FIG. 3, a second, receiving, transducer 10b, which is like transmitting transducer 10a and which is also oriented orthogonally to the flow 32, has been added. This receiving transducer 10b is spaced apart from the first transducer 10a along the flow direction and is located at a predetermined distance downstream of transducer 10a. The transducer 10a is electrically energized to move upwardly, as indicated by arrow 52, and thereby imparts a clockwise rotation to a volume of fluid 30 which, after a period of time determined by the overall flow rate, reaches the transducer 10b. The rotating volume of fluid 30, when moving past transducer 10b, imparts to it consecutively, vertically downwards, horizontal and vertically upwards forces, which transducer 10b converts to the corresponding electrical signals from which a received time is derived. The difference in time between the signal energizing transducer 10a and the detection output signal produced by transducer 10b, when detecting the corresponding rotating volume of fluid 30, is a measure of the flow rate of the fluid 31 and may be electronically processed by various means well established in the current art, to provide the output signal required for a particular application.

Figure 4A:
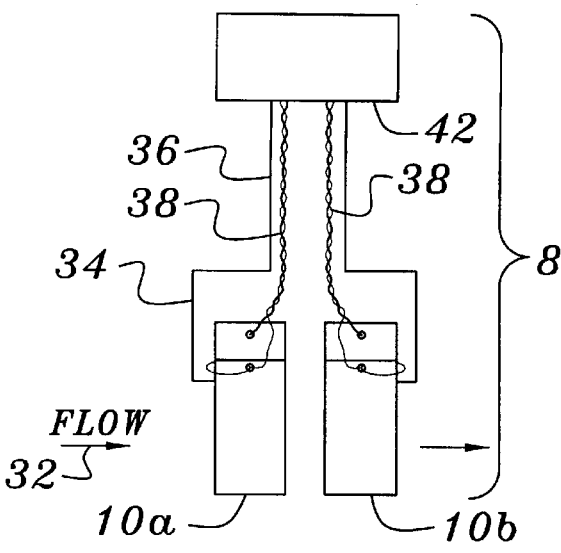
FIGS. 4a–4g are largely schematic elevational views of several embodiments of the invention wherein each embodiment comprises more than one transducer.

FIG. 4a is a largely schematic depiction of the basic components of a flow sensing probe 8 that uses the transducer arrangements of FIG. 3. The transducers 10a and 10b comprise a lower portion of the probe 8 and make contact with the fluid 31. The top ends of transducers 10a and 10b are mounted in a support 34 which also contains their wired connections 38 routed through a tube 36 to the supporting electronics enclosure 42, which is preferably not immersed in the fluid. The transducers 10a and 10b may also be located in a round tube to provide for the basic configuration of a similarly functioning inline flow sensor. Transducers 10a and 10b may be surrounded by a mechanical support (not shown for clarity) to protect them from mechanical damage, and to straighten, smooth or otherwise condition the fluid flow. Fluid flow 32 (depicted as coming from the left in FIG. 4a), is acted upon by transducer 10a to produce rotating volumes of fluid 30, which are carried by the fluid flow downstream and detected by transducer 10b. The interval of time between the generation of the rotating volumes of fluid 30 and their detection by transducer 10b, is a measure of the flow rate of the fluid 31. Electronic processing of that time enables the fluid flow rate to be determined.

Figure 4B:
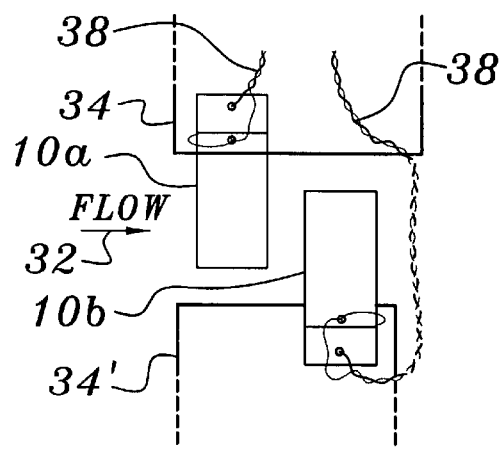

A wide variation of mountings is possible for transducers 10a and 10b providing they remain essentially inline with the axis of the flowing fluid. For example, in FIG. 4b only the impulse-generating transducer 10a is mounted in support 34 with its connecting wires 38 passing upwards as before. The receiving transducer 10b is mounted in another support 34', and its connecting wires 38 are suitably routed to eventually reach the supporting electronics enclosure 42.

In a further variation of the mechanical configuration of the present invention, more than one pair of transducers 10a and 10b may be used at different locations of a probe 8 to sense the flow rate of fluid, so that their output signals may be combined to reduce flow rate measurement errors due to flow profile and other flow related variations. The transducer 10a and 10b pairs may operate at the same time or may be activated at different times in a time sharing mode to minimize power consumption and the amount of supporting electronics required.

The use of multiple pairs of transducers has other advantages. For example, should a pair of transducers 10a, 10b and an associated electronic circuit provide flow rate signals significantly different from the average flow rate signals calculated from other pairs of transducers, the failure of that part of the flow sensor would be detectable and, until the flow sensor was serviced, the erroneous flow sensor signal could be omitted from the averaged output flow rate signal. This would allow the flow sensor to continue contributing valuable flow rate data during a period when it could not be serviced and in a respect make it, through redundancy, failure proof.

Figure 4C:
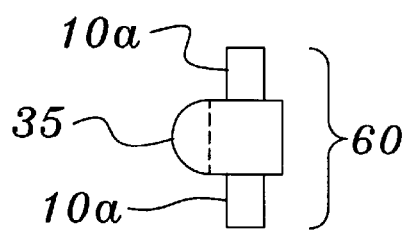
Figures 4D, 4E:
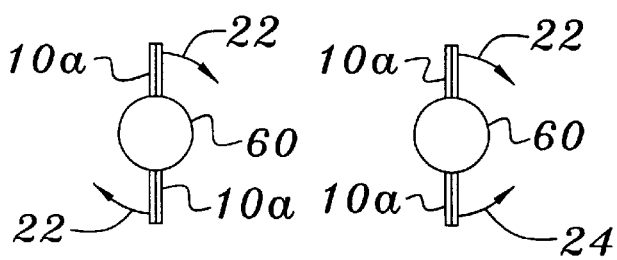

One arrangement of the transducers is illustrated in FIG. 4c which is a side view of two transducers 10a radially mounted to a streamlined hub 35 to form a complete transducer assembly 60. As shown in the corresponding end views of FIG. 4d and FIG. 4e, the transducers 10a may be phased to provide the same (i.e., FIG. 4e) or opposing (i.e., FIG. 4d) angular movement as indicated by arrows 22 and 24. An identical transducer assembly 60 can functions in a receiving role. When the transducers 10a and 10b are phased as in FIG. 4d, the resultant of the acoustic forces 22 is angular and balanced, and can reduce the direct acoustic coupling between both assemblies 60.

Figures 4F, 4G:
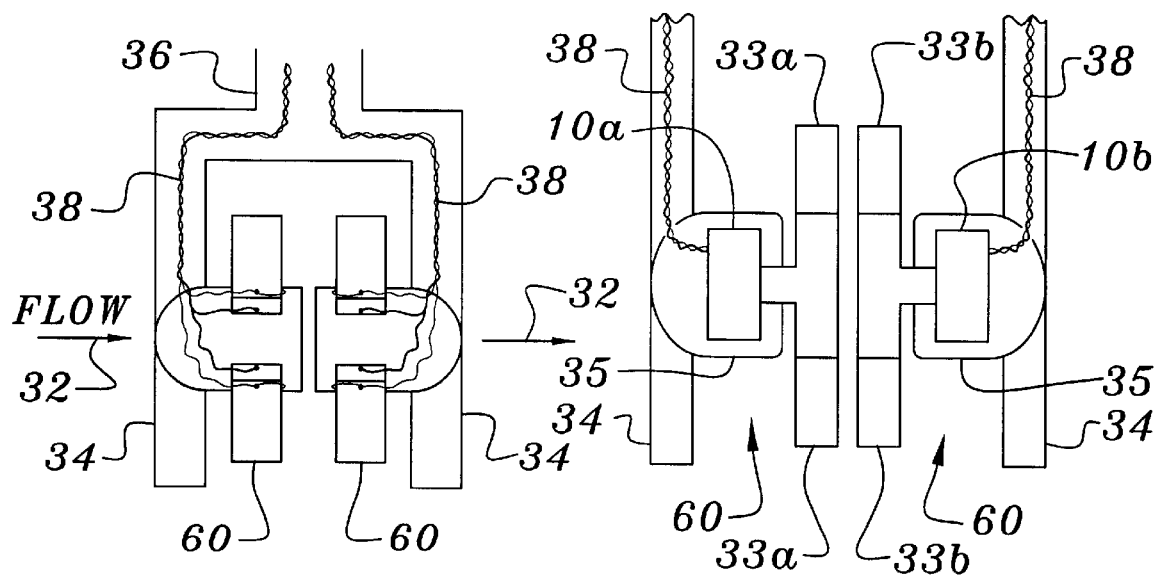

In FIG. 4f, two streamlined hub transducer assemblies 60 are depicted as being mounted coaxially on a portion of a mechanical support 34. The assembly on the left of FIG. 4f provides the impulses and the assembly on the right of FIG. 4f acts as the receiver. Wires 38 from the transducers 10a and 10b are shown as being routed through tube 36 to an enclosure 42. Fluid flow 32, coming from the left, is acted upon by the left, upstream, transducer assembly 60 to produce rotating volumes of fluid which are then detected by the right, downstream, transducer assembly 60. The interval of time between the generation of the rotating volumes of fluid 30 and their detection is a measure of the flow rate of the fluid 31.

In FIG. 4f the two pairs of transducer assemblies 60 are preferably not directly joined together. This is done to minimize signal transfer directly between the two. Each transducer assembly 60 can support more than the two transducers shown. For example, one could use four transducers, with a 90 degree separation between them and a circular shroud surrounding them for mechanical protection. The shroud could be replaced by a more substantial tube so that the entire assembly would take on the form of an inline flow meter.

It may be noted that the flow sensor of the invention can be made with impulse generating and sensing means other than piezoelectric transducers. In FIG. 4g, for example, each transducer assembly 60 comprises a plurality of transducers, each of which may act on the fluid or be acted upon by the fluid by intermediary means, such as the vanes 33a, 33b that are depicted as being attached to the outside of a displaceable hub 35. In the arrangement depicted in FIG. 4g, the transducers 10a, 10b may be electromagnetic transducers such as a DC motor attached to and angularly displacing a hub 35 with a radial array of vanes to provide a transmission function like that of transducer 10a. Therefore, a single transducer 10a can activate many vanes generating many rotating volumes of fluid. This same combination of DC motor and hub with radial array of vanes will also generate a signal when the vanes are displaced by the rotating fluid and thereby provide a receiving function like that of transducer 10b. In this case the receiver can be responsive to an average of the rotating volumes of fluid sensed by its vanes. An example of a motor type which will perform both transmitting and receiving functions, and that provides magnetic detenting for alignment of the vanes, is one made by Saia-Burgess, Inc., series UAF. In some applications, the transducers for the receiving and transmitting functions need not be identical so that a wide variety of different types of transducers may be used to provide these functions.

A wide variation in signal processing techniques is possible using the basic concept of generating and detecting rotating volumes of fluid and measuring the time interval between the two. For example, in FIG. 3, both transducers 10a and 10b may be simultaneously energized to produce two rotating volumes of fluid 30 and then switched into respective receiving modes to detect the resultant rotating volumes of fluid 30 reaching each transducer 10a and 10b. The difference in time between the signals detected by each of the transducer 10a and 10b is a measure of flow rate of the fluid. The difference in time between the generation and detection of a rotating volume by either transducer is thus a measure of flow rate.

In FIG. 3, transducer 10a may further be energized with a series or burst of pulses where the burst duration is small relative to that burst repetition rate. Transducer 10a may also be energized with a continuous series of pulses which include sinusoidal waves. Using means such as these, for example, a series of rotating volumes of fluid 30, which alternate in direction, pass by transducer 10b at the rate of the flowing fluid and are sensed accordingly to produce the corresponding electrical signals. Phase detectors such as an Exclusive-Or type may be used to determine the interval between the time transducer 10a generates of the rotating volumes of fluid 30 and the time transducer 10b receives the rotating volumes.

In FIG. 3, transducers 10a and 10b can also continuously exchange functions whereby transducer 10a produces the rotating volumes of fluid 30 while transducer 10b detects them, and then transducer 10b produces the rotating volumes of fluid 30 while transducer 10a detects them, and so forth. This would enable a time difference measurement to be made between the upstream and downstream conditions and would cancel common mode time measurement errors. It would also provide a balanced arrangement for detecting flow in both directions.

Figure 5:
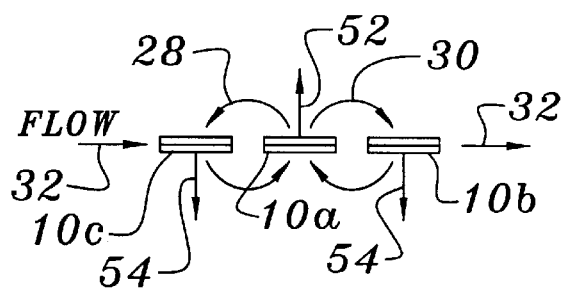
FIG. 5 is an end view of three transducers of FIG. 1, the view including arrows schematically depicting the action of the transducers on the flowing fluid.

In FIG. 5, a third transducer 10c is also depicted as being oriented orthogonally to the direction of fluid flow 32, as are transducers 10a and 10b. In a preferred embodiment, as depicted in FIG. 5, the third transducer 10c is disposed on the upstream side of transducer 10a. In a preferred operating mode in which one generates large enough rotating volumes in a fluid flowing slowly enough, the rotating volumes 28, 30 produced by the movement of transducer 10a engage both transducers 10b and 10c (which would typically be located equidistant from transducer 10a). Flowing fluid 32 will increase the reception time of the rotating volume of fluid 28 reaching transducer 10a while reducing the reception time of the rotating volume of fluid 30 reaching transducer 10b. The time difference between the signals detected by transducers 10*b* and 10*c* is then a measure of the flow rate of the fluid. It will be understood that one could also use an array of three transducers in which two receiving transducers were disposed downstream of a driven transducer.

FIGS. 6*a*–6*c* are simplified drawings depicting flow sensors similar to those of FIGS. 4*a*–4*g* but using the transducer arrangement of FIG. 5. The comments relating FIGS. 4*a*–4*g* are generally applicable to FIGS. 6*a*–6*c*. In FIG. 6*c*, the center assembly 60, incorporating transducers 10*a*, has a shortened hub (dotted line in FIG. 4*c*) to nest conveniently between the side assemblies 60 on either side, which incorporate the receiving transducers. Transducers 10*a*, 10*b*, and 10*c* are mounted at the bottom of the probe and make contact with the fluid flow 32. The top ends of transducers 10*a*, 10*b* and 10*c* are mounted in a support 34 which also contains their wired connections 38 routed through a supporting tube 36 to the supporting electronics enclosure 42 (as in FIG. 4*a*). Transducers 10*a*, 10*b* and 10*c* are preferably located in an enclosure (not shown) to protect them from mechanical damage and to straighten, smooth or otherwise condition the fluid flow. The mechanical arrangement of transducers 10*a*, 10*b* and 10*c* shown in FIGS. 6*a*–6*c* are similar to those of FIGS. 4*a*–4*g*. These transducers could also be mounted in a protective shroud, or in aground tube, for example, to provide for the basic configuration of an inline flow sensor. As in FIG. 4*g*, a single transducer 10*a* incorporating a DC motor for example, can activate an array of vanes to produce the rotating volumes of fluid 28 and 30 while single transducers 10*b* and 10*c* can each be joined to their respective array of vanes to receive them. When arranged radially, transducer 10*a* would preferably be centered between 10*b* and 10*c*.

In FIG. 6*a* fluid flow 32, coming from the left, is acted upon by transducer 10*a* to produce rotating volumes of fluid 30, 28 which are detected by transducer 10*b* and 10*c*, respectively. This, of course, requires that the flow rate be low enough, the rotating volume 28 large enough, and the transducer size and spacing be such that the disturbance is not carried downstream before being sensed adequately by both transducers. The time interval between detection of the rotating volumes of fluid by transducers 10*b* and 10*c* is the basis for producing signals indicative of the flow rate of the fluid.

As a specific example of an implementation of the present invention, a flow probe was configured in accordance with the depiction of FIG. 6*a* The transducers 10*a*, 10*b*, and 10*c* were commercially available stripe actuators made by APC International Ltd., and listed in their catalog as part no. 490/018/060-SA. This stripe actuator has an overall length of 1.929", a width of 0.071", and a thickness of 0.024". The three transducers 10*a*, 10*b* and 10*c* were mounted and encapsulated in line, spaced 0.030" apart and generally centered in a plastic support 34 which is 0.950" wide by 0.450" deep by 0.650" high, to which a 0.375" diameter by 12" long tube was attached to join to the supporting electronics enclosure at the opposite end. The transducers were also surrounded by a metal frame for protection.

Figure 8:
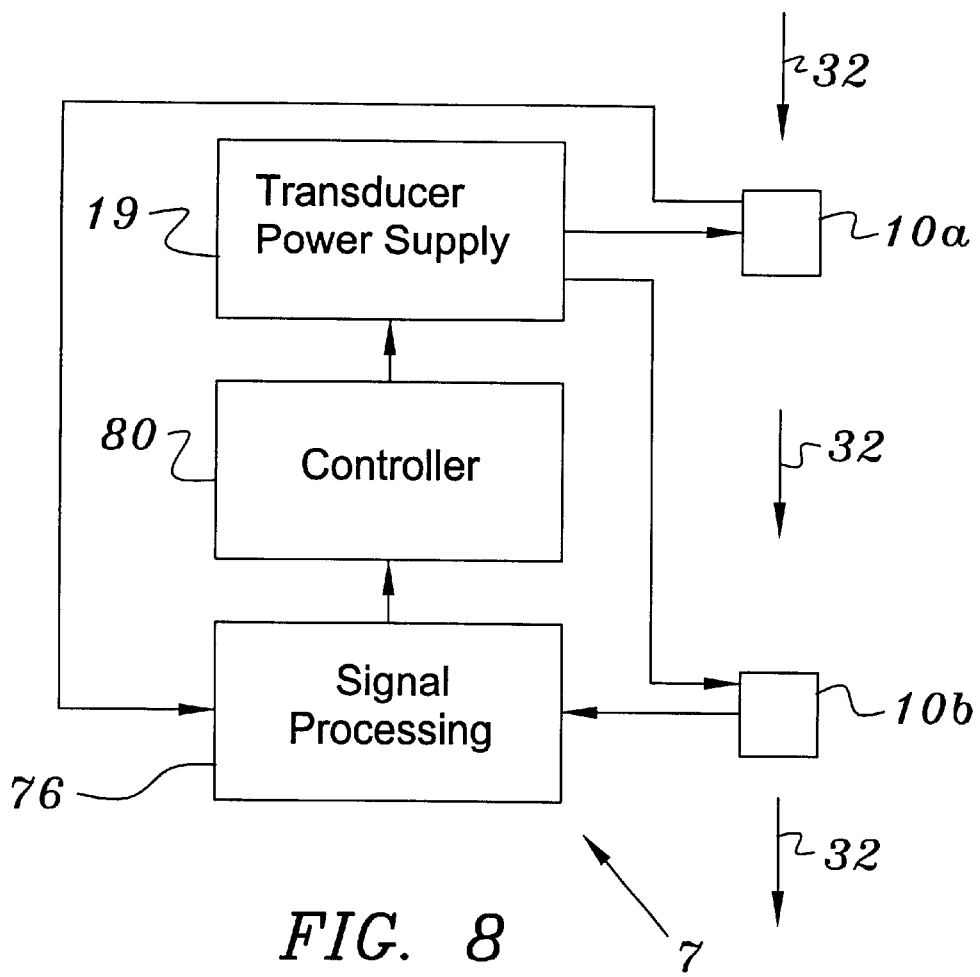
FIG. 8 is a simplified electrical block diagram of a general transducer driving and signal processing arrangement used with various embodiments of the invention.

Turning now to FIG. 8, one finds a general depiction of a preferred flow sensor of the invention in which a controller 80 controls a transducer power supply 19 to selectively energize one or more transducers 10*a*, 10*b*. As hereinbefore noted, in various embodiments of the invention, the power supply 19 may be selected to supply single pulses, bursts of pulses, a constant AC excitation at a selected frequency, or a chirp comprising multiple frequencies. Inasmuch as preferred transducers are operable as either a source of mechanical motion, or as a detector of mechanical motion, FIG. 8 depicts an arrangement in which either or both of the transducers may be used in either mode. Electrical outputs from the transducer(s) are supplied to a signal processing circuit adapted to measure the time interval between the generation of a volume of rotating fluid by a first transducer (e.g., 10*a*) and the detection of that volume by another transducer (e.g., 10*b*).

For a more specific depiction of a preferred arrangement for powering and extracting a signal from a flow sensor 7, one may turn to FIG. 7 to find a simplified block diagram of an output portion of an AC voltage source 19 and of signal processing electronic circuitry 76 that may be used with the flow probe that is depicted in FIG. 6*a*. An AC voltage source 19 comprises a crystal oscillator 70 that preferably provides a continuous 32,768 kilohertz signal to a frequency divider 72 which divides that frequency by one hundred twenty eight to produce a resultant signal with a frequency of 256 Hz. The 256 Hz signal is input to an amplifier 74 which powers transducer 10*a*, causing it to vibrate at 256 Hz. The vibrations of transducer 10*a* generate a continuous series of rotating volumes of fluid which alternate in direction at the operating frequency of 256 Hz, and which are sensed by transducers 10*b* and 10*c*, each of which provides an input to respective amplifiers 56 and 58. The outputs of the amplifiers 56, 58 are input to a phase detector 78, which may be an exclusive-or type configured so that in-phase signals produce a zero output and with signals 180 degree out of phase produce a maximum output, which is typically five volts DC with a five volt power supply. The output from the phase detector 78 is filtered by low pass filter 62 to remove carrier frequency (256 Hz) components prior to entering amplifier 64 which provides the flow rate output signal. The output amplifier 64 is preferably adjustable in amplification factor and has a span control to enable the apparatus to be calibrated (e.g., 1.0 volt per foot per second) for a particular application. It is also preferably adjustable in offset so that one can set the output level at zero or at a particular amount above or below zero, at a zero or other designated low flow rate. In one embodiment the apparatus was configured so that when the fluid is flowing at the rate of 1 foot per second, the output voltage from the low pass filter is about 0.2 volts.

As an alternate to, or in addition to the above adjustments, and in a manner generally applicable to other embodiments of the present invention, the operating frequency may be adjusted for span control. Here, an increase in frequency increases the magnitude of the output flow rate signal by increasing the phase shift between the input signals to the phase detector 78 for a given flow rate of the fluid 32. This adjustment range is normally limited because the total phase shift change of the input signals to the phase detector 78 beyond its 0 to 180 degree operating range will result in a reversal of the direction change of the rate output signal for the next 180 degrees, and then a reversal for the next 180 degrees, and so forth, so as to make the output signal ambiguous. However, more than one frequency may be transmitted and received so that the phase detection ambiguity from operation at the higher frequency is resolved by unambiguous operation at the lower frequency. Similar arrangements are well known in the signal processing field and are conventionally employed with continuous wave radar systems. In the use of the apparatus of the invention, this signal processing approach may be used to increase the precision of detection of the time interval between the two received signals across the entire measurement range of the flow probe.

In the apparatus of the invention the transmitting frequency may be also be controlled responsive to the measured magnitude of the flow rate. In such cases the frequency is arranged to increase with a reduction in flow rate, so that the precision of flow rate measurement at low flow rates would improve thereby increasing the useful flow range of the flow sensor.

The zero offset adjustment discussed above may be made by introducing a small phase shift into the input or output signals of either or both amplifiers 56 and 58. Note that if the phase shift is made 90 degrees, the phase detector 78 will operate at the center of its operating range when the flow rate is zero so that its flow rate could be detected equally in both directions.

Embodiments of the present invention may be used for determining the flow rate over a wide range of density and acoustic properties of the fluid. Moreover, the fluid may comprise liquid and gaseous states. The same flow sensor 10 can then perform the functions of two flow sensors for example, when the type or state of the flowing fluid changes. Since the acoustic coupling between the transducer 10 and the flowing fluid will be different for each condition of the flowing fluid 32, the magnitude of signals detected will also be different. This difference can be used to identify the state of the fluid in addition to determining its flow rate.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. An apparatus for measuring a rate of flow of a fluid along a predetermined flow direction by imparting a motion in addition to that of the fluid flow to only a portion of the fluid, the apparatus comprising:
   a transducer power supply;
   a first transducer electrically connected to the transducer power supply so as to move in a direction perpendicular to the flow direction when powered by the power supply and to thereby generate a rotating portion of the fluid;
   a second transducer spaced apart from the first transducer along the flow direction, the second transducers providing detection output to a signal processing circuit when the second transducer is moved perpendicular to the flow direction by the rotating portion of the fluid; and wherein
   the signal processing circuit has a flow rate output responsive to a difference in time between the generation of the rotating portion of the fluid by the first transducer and the detection output from the second transducer.

2. The apparatus of claim 1 wherein the flow rate output is an average flow rate.

3. The apparatus of claim 1 further comprising a third transducer spaced apart from the first transducer and the second transducer along the flow direction, the third transducer having a respective detection output, separate from the detection output of the second transducer, to the signal processing circuit when moved perpendicular to the flow direction by the rotating portion of the fluid, and wherein the flow rate output is further responsive to a respective difference in time between the generation of the rotating portion of the fluid by the first transducer and the detection output from the third transducer.

4. The apparatus of claim 3 wherein the third transducer is upstream from the first transducer and the second transducer is downstream from the first transducer.

5. The apparatus of claim 3 wherein both the second and the third transducers are downstream from the first transducer.

6. The apparatus of claim 1 wherein the transducer power supply is an AC power supply.

7. The apparatus of claim 1 wherein the transducer power supply supplies a single voltage pulse.

8. The apparatus of claim 1 wherein the transducer power supply supplies a burst of voltage pulses.

9. The apparatus of claim 1 wherein the transducer power supply supplies an alternating voltage at a plurality of frequencies.

10. The apparatus of claim 1 wherein
    the second transducer moves in a direction perpendicular to the flow direction when powered by the power supply and thereby generates a second rotating portion of the fluid;
    the first transducer provides a second detection output to the signal processing circuit when moved perpendicular to the flow direction by the second rotating portion of the fluid; and
    wherein the flow rate output is further responsive to a difference in time between the generation of the second rotating portion of the fluid by the second transducer and the second detection output from the first transducer.

11. The apparatus of claim 1 wherein the first and the second transducers comprise respective piezoelectric benders.

12. The apparatus of claim 1 wherein the first and the second transducers comprise respective electromagnetic transducers.

13. An apparatus for measuring a rate of flow of a fluid along a predetermined flow direction by imparting a motion in addition to that of the fluid flow to only a portion of the fluid, the apparatus comprising:
    a transducer power supply;
    a transmitting transducer electrically connected to the transducer power supply, the transmitting transducer moving in a direction perpendicular to the flow direction when powered by the power supply and thereby generating a rotating portion of the fluid;
    a plurality of receiving transducers spaced apart from the transmitting transducer along the flow direction, each of the receiving transducers providing a respective detection output to a signal processing circuit when the receiving transducer is moved perpendicular to the flow direction by the rotating portion of the fluid; and wherein
    the signal processing circuit has a flow rate output responsive to a difference in time between two of the detection outputs.

14. The apparatus of claim 13 wherein a first of the receiving transducers is upstream from the transmitting transducer and a second of the receiving transducers is downstream from the transmitting transducer.

15. The apparatus of claim 13 wherein all of the receiving transducers are downstream from the transmitting transducer.

16. The apparatus of claim 13 wherein the transducer power supply is an AC power supply and wherein the difference in time between the two of the detection outputs comprises a phase difference.

17. The apparatus of claim 13 wherein the transducer power supply supplies a single voltage pulse.

18. The apparatus of claim 13 wherein the transducer power supply supplies a burst of voltage pulses.

19. The apparatus of claim 13 wherein the transducer power supply supplies an alternating voltage at a plurality of frequencies.

20. A method of measuring a rate of flow of a fluid flowing in a flow direction, the method comprising the steps of:
   a) generating at a first time, by a first transducer driven by a transducer power supply, a rotating volume of the fluid at a first predetermined location within the fluid, the rotating volume moving in the flow direction with the rate of flow, the rotating volume comprising only a portion of the fluid;
   b) detecting, by a second transducer, the rotating volume at a second time, later than the first time, at a second predetermined location spaced apart from the first predetermined location along the flow direction by a predetermined spacing; and
   c) determining the rate of flow from the predetermined spacing and the difference between the first and the second times.

21. The method of claim 20 wherein in step a) the transducer power supply comprises a source of alternating electric voltage having a frequency, the method further comprising a step d), after step c) of:
   d) controlling the frequency of the source of alternating electric voltage responsive to the rate of flow determined in step c).

22. The method of claim 20 wherein the transducer power supply comprises a source of alternating voltage whereby steps a) and b) are carried out repetitively.

23. The method of claim 20 wherein the detecting step b) is carried out by both the second transducer and a third transducer disposed at a third predetermined location spaced apart from the second and the first transducers; and wherein step c) is carried out by an electric circuit responsive to a difference in phase between respective outputs from the second transducer and the third transducer.

24. The method of claim 20 wherein
   step a) further comprises generating, by the second transducer, a second rotating volume of the fluid;
   step b) further comprises detecting, by the first transducer, the second rotating volume of the fluid at a third time, later than the first time; and
   step c) comprises determining the rate of flow from the predetermined spacing and the differences between the first, the second and the third times.

* * * * *